United States Patent
Baumann et al.

(10) Patent No.: US 10,782,698 B1
(45) Date of Patent: Sep. 22, 2020

(54) DATA PROCESSING SYSTEMS AND METHODS FOR PROVIDING RELOCATION ALERTS

(71) Applicant: State Farm Mutual Automobile Insurance Company, Bloomington, IL (US)

(72) Inventors: Nathan Wilhelm Baumann, Bloomington, IL (US); Megan Baumann, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 185 days.

(21) Appl. No.: 15/900,249

(22) Filed: Feb. 20, 2018

(51) Int. Cl.
  *G05D 1/02* (2020.01)
  *G01C 21/36* (2006.01)
  *G08G 1/127* (2006.01)
  *B60R 25/24* (2013.01)
  *G06Q 40/08* (2012.01)

(52) U.S. Cl.
  CPC .......... *G05D 1/0214* (2013.01); *B60R 25/24* (2013.01); *G01C 21/362* (2013.01); *G08G 1/127* (2013.01); *G06Q 40/08* (2013.01)

(58) Field of Classification Search
  CPC .... G05D 1/0214; G01C 21/362; G06Q 40/08; B60R 25/24; G08G 1/127
  See application file for complete search history.

(56) References Cited

U.S. PATENT DOCUMENTS

| | | | |
|---|---|---|---|
| 6,049,781 A | 4/2000 | Forrest | |
| 7,643,834 B2 | 1/2010 | Ioppe | |
| 8,301,158 B1 | 10/2012 | Thomas | |
| 9,501,934 B2 | 11/2016 | Inaba | |
| 9,734,721 B2* | 8/2017 | Stenneth | G08B 25/007 |
| 10,386,835 B2* | 8/2019 | Vogt | G01C 21/3438 |
| 2006/0053464 A1 | 3/2006 | Kendall | |
| 2006/0273884 A1* | 12/2006 | Watkins | G08B 25/007 340/425.5 |
| 2008/0004790 A1* | 1/2008 | Ames | G01C 21/3461 701/117 |
| 2009/0309742 A1 | 12/2009 | Alexander | |
| 2012/0078509 A1* | 3/2012 | Choi | G01C 21/3415 701/423 |
| 2015/0269600 A1 | 9/2015 | Randle | |

(Continued)

*Primary Examiner* — Dale W Hilgendorf
*Assistant Examiner* — Alexander C. Bost
(74) *Attorney, Agent, or Firm* — Armstrong Teasdale LLP

(57) ABSTRACT

A data processing and relocation alerts system for processing data and provided relocation alerts is provided. The data processing and relocation alerts system includes at least one processor in communication with at least one database. The at least one processor is programmed to: (i) store profile data for registered users including at least a user identifier, contact data, at least one asset identifier, and an asset location; (ii) receive geographical location data for an impact area; (iii) store the impact area location data in the database; (iv) compare the impact area location data to the registered user profile data to identify the at least one registered asset located within the impact area; (v) retrieve contact information of impacted registered users based on the comparison; (vi) identify at least one safe area for relocation of the at least one registered asset; (vii) transmit a relocation alert using the contact information.

27 Claims, 7 Drawing Sheets

(56) References Cited

U.S. PATENT DOCUMENTS

| | | |
|---|---|---|
| 2016/0232479 A1 | 8/2016 | Skaaksrud |
| 2017/0358196 A1 | 12/2017 | Jang |
| 2019/0135231 A1* | 5/2019 | Sakuma ................ B60R 25/305 |
| 2019/0202463 A1* | 7/2019 | Anderson ............. B60W 40/02 |
| 2019/0204101 A1* | 7/2019 | MacRae ............. G01C 21/3423 |
| 2019/0235487 A1* | 8/2019 | Zhao .................... G05D 1/0027 |
| 2019/0250621 A1* | 8/2019 | Ghannam .............. G08B 21/10 |

* cited by examiner

DATA PROCESSING SYSTEMS AND METHODS FOR PROVIDING RELOCATION ALERTS

FIELD OF THE DISCLOSURE

The present disclosure relates to processing data from various sources and providing relocation alerts. More specifically, to data processing systems and methods for processing data to identify potential dangers within a geographical area, identifying valuable assets designated for protective measures located within an impact area, alerting responsible parties that certain assets may be harmed, identifying potential safe relocation areas, and relocating the valuable assets to said safe areas.

BACKGROUND

In the event of an impending natural disaster it may be important to take measures to protect people and valuable assets from harm. In many instances, highly valuable possessions may be moved before a severe event occurs. Predictive data, such as weather related data or data collected to identify and predict natural phenomena may be aggregated or collected to predict imminent dangers. A variety of institutions such as the National Oceanic and Atmospheric Administration, public and private universities, and the National Weather Service, may collect and report on dangers for an area, often identifying geographical areas that may be impacted.

Although certain disasters may be predictable, oftentimes it may be difficult to remove valuable assets from an impact area (e.g., an area predicted to experience a natural disaster or other type of catastrophic event). For example, large structures oftentimes may not be moved prior to a major storm. In the event of an evacuation, people leaving a dangerous area may only be able to take with them a limited number of belongings. As a result, some possessions may be stored, while others may simply be abandoned. For example, in many cases, families may have more than one vehicle. It is common, however, for families to stay together in the event of an impending natural disaster. A family evacuating an affected area may be forced to leave a vehicle behind, parked in a driveway or other location exposed to the dangers of the elements and potential harms from the impending disaster. Unfortunately, a family may have few options other than to hope that the vehicle will survive any harm. If severe flooding or firestorms occur, vehicles and other assets that owners are unable to transport may be damaged or destroyed. There exists a need to conveniently or automatically transport and relocate valuable assets to a safe area in the event of a predicted danger for an area.

BRIEF SUMMARY

The present disclosure may relate to data processing systems and methods for providing relocation alerts. The system may include a data processing relocation alert system for identifying areas that may be impacted by disaster or catastrophic events, identifying valuable assets in the impact area utilizing geolocation telematics, and transmitting relocation alerts.

In some exemplary embodiments, the data processing system may include a processor in communication with at least one database. The data processing system may be configured to: (i) store profile data for registered users, the profile data including at least a user identifier, contact data, at least one asset identifier associated with the user identifier, and an asset location for the at least one asset identifier; (ii) receive geographical location data for an impact area; (iii) store the impact area location data in the at least one database; (iv) compare the impact area location data to the registered user profile data to identify the at least one registered asset located within the impact area; (v) retrieve contact information of impacted registered users based on the comparison; (vi) identify at least one safe area for relocation of the at least one registered asset; (vii) transmit a relocation alert using the contact information.

In one aspect, a non-transitory computer-readable storage media having computer-executable instructions embodied thereon for processing data and providing relocation alerts may be provided. When executed by at least one processor of a data processing computer device, the computer-executable instructions may cause the at least one process in communication with the at least one database to: (i) store profile data for registered users, the profile data including at least a user identifier, contact data, at least one asset identifier associated with the user identifier, and an asset location for the at least one asset identifier; (ii) receive geographical location data for an impact area; (iii) store the impact area location data in the at least one database; (iv) compare the impact area location data to the registered user profile data to identify at the least one registered asset located within the impact area; (v) retrieve contact information of impacted registered users based on the comparison; (vi) identify at least one safe area for relocation of the at least one registered asset; (vii) transmit a relocation alert using the contact information.

In another aspect, a computer-implemented method for data processing and providing relocation alerts may be provided. The method may be implemented using a data processing computer device. The method may be implemented using at least one processor in communication with at least one database. The method may include: (i) storing profile data for registered users, the profile data including at least a user identifier, contact data, at least one asset identifier associated with the user identifier, and an asset location for the at least one asset identifier; (ii) receiving geographical location data for an impact area; (iii) storing the impact area location data in the at least one database; (iv) comparing the impact area location data to the registered user profile data to identify the at least one registered asset located within the impact area; (v) retrieving contact information of impacted registered users based on the comparison; (vi) identifying at least one safe area for relocation of the at least one registered asset; (vii) transmitting a relocation alert using the contact information.

Advantages will become more apparent to those skilled in the art from the following description of the preferred embodiments which have been shown and described by way of illustration. As will be realized, the present embodiments may be capable of other and different embodiments, and their details are capable of modification in various respects. For example, and as described herein, the data capture and analysis processes described herein may include functionality that permits a user to "opt in" and/or "opt out" of these processes, such that the user's privacy is preserved. Accordingly, the drawings and description are to be regarded as illustrative in nature and not as restrictive.

BRIEF DESCRIPTION OF THE DRAWINGS

The Figures described below depict various aspects of the data processing systems and methods for providing relocation alerts which are disclosed therein. It should be understood that each Figure depicts an embodiment of a particular aspect of the disclosed data processing systems and methods for providing relocation alerts, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
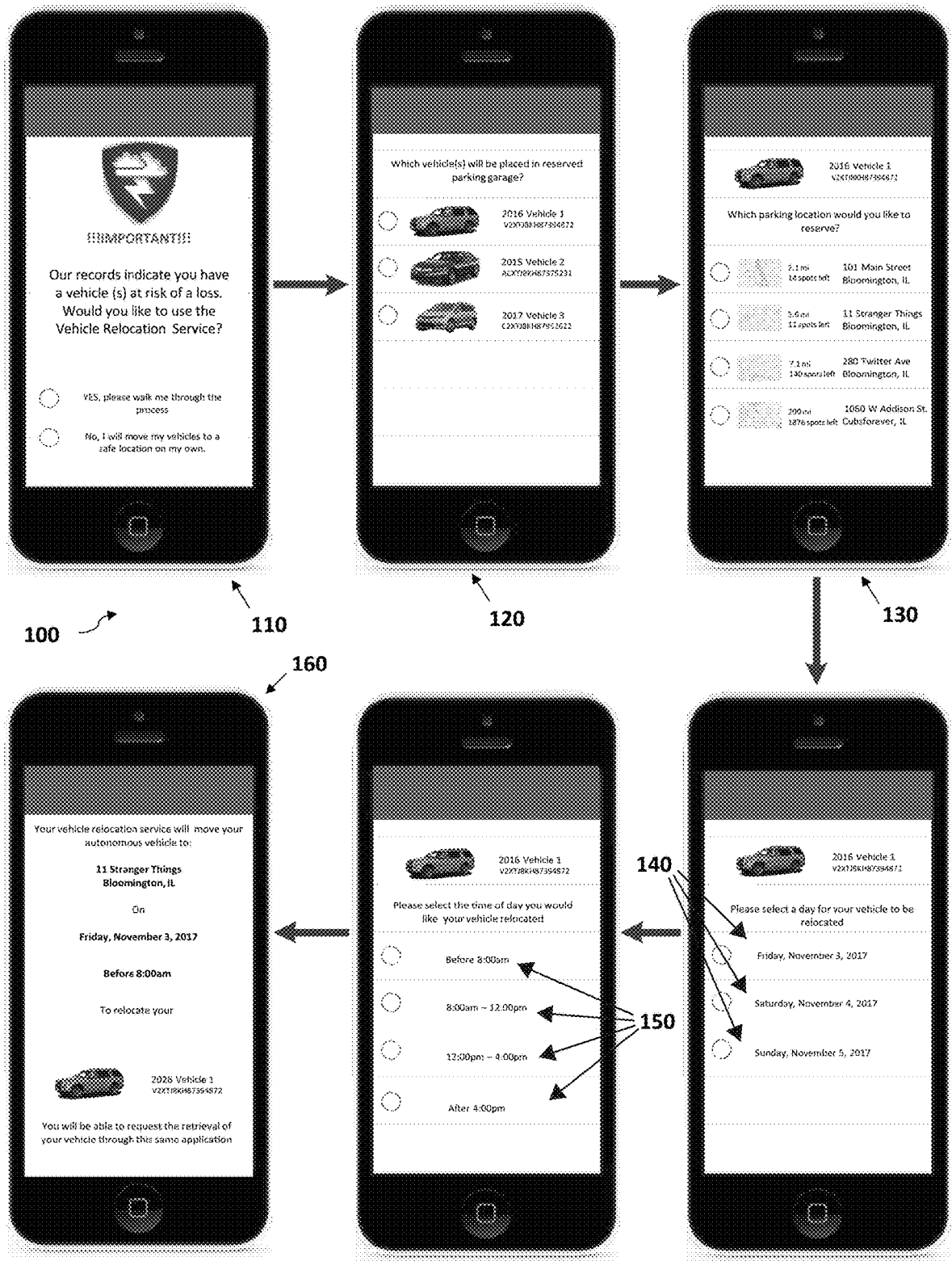
FIG. 1 illustrates a data flow diagram for configuring relocation parameters on a user computer device in communication with an exemplary data processing and relocation alert system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, data processing systems and methods for providing relocation alerts. In one exemplary embodiment, the process may be performed on a data processing computer device.

In the exemplary embodiment, a data processing relocation alert system may include a data processing computer device. The data processing computer device may include at least one processor and at least one database in communication with the at least one processor. The data processing computer device may be configured to store a profile for registered users. Users interested in receiving services may register with the data processing relocation alert system to receive relocation alerts for events affecting a geographical area. In some embodiments users may register at least one asset with the data processing relocation alert system to receive relocation alerts identifying the registered asset. In some embodiments users may register contact information with the data processing relocation alert system to receive alerts through preferred methods of contact (e.g., telephone, email, text message, social media, etc.). In other embodiments the data processing relocation alert system may provide an app on a user computer device or a device to communicate with the user. The data processing relocation alert system may be configured to store the user data as a profile in a memory location such as a database.

In some embodiments the data processing computer device may receive data for a geographical area from a plurality of sources in a variety of formats. The data may include information pertaining to natural phenomena such as weather, volcanic activity, geological activity, and oceanographic activity. In some embodiments the data may include other types of data such as social media data, political news and information, military reports, animal migratory patterns, health related data including viral and bacterial contagion rates from organizations such as the World Health Organization, or data pertaining to pests, rodents, insects, agricultural activity, and/or astronomical phenomenon (e.g. solar flares).

The data processing computer device may be configured to convert the disparate data sets into a uniform data set for analysis. For example, relationships between the disparate data sets may be correlated with one another through a single or multiple key values such as time and location. The data may then be stored in, for example, a look up table. The re-organization of the data facilitates efficient and immediate access for analysis and interpretation. Additionally or alternatively, the data may be accessed in real-time and/or updated based on new data in real-time to dynamically update the assessment for a geographical location.

In one embodiment the data processing computer device may be configured to generate a model using the received data. The data processing computer device may then analyze and or execute a simulation of the model to identify and/or predict impending dangers such as flood, wildfire, hurricane, tornado, earthquake, volcano, tidal wave, or asteroid or meteor collisions. In some embodiments the data processing computer device may be configured to use the model to identify and/or predict dangers such as riot, war, or other types of political upheaval or humanitarian crises. In the exemplary embodiment the data processing computer device may generate an assessment for the geographical location using the model. At least part of the geographical location may be designated an impact area. In some embodiments the assessment may include a recommendation to evacuate the area or a warning of impending danger. In some embodiments the assessment may include a probability of damage for the geographical location and/or a probability of damage for assets located in the geographical area.

In the exemplary embodiment the data processing relocation alert system may store the identified impact area in a memory location such as a database. In the exemplary embodiment the data processing relocation alert system may compare the identified impact area location data with the stored user profile data to identify at least one registered asset located within the impact area.

In another embodiment the data processing computer device may be configured to locate an asset in the geographical location using geolocation telematics. For example, the valuable asset may be configured to generate telematics data using a Global Positioning System (GPS) device or other sensors mounted or installed on the asset. In the exemplary embodiment the asset may be a vehicle equipped with a variety of sensors. For example, the vehicle may include sensors such as front view and/or side view cameras, LIDAR, radar, weight sensors, accelerometer, gyroscope, compass and/or other types of sensors to identify the location and/or position of the vehicle, surrounding objects, and/or internal objects or persons. In other embodiments, the telematics data may include images of assets in the geographical location. For example, a mobile vehicle or aerial survey may capture images of assets located in the impact area. The images may include identifying information such as license plates. The data processing relocation alert system may retrieve corresponding contact information from identifying information extrapolated from the images to notify owners of potential harm to their assets. In some embodiments, the owners or parties responsible for the assets may be prompted to register with the data processing relocation alert system for relocation services.

In the exemplary embodiment, the data processing computer device may retrieve the telematics data to identify the location of the asset. Additionally or alternatively, the telematics data may be used to determine potential travel routes for relocation services, the current state of a particular location, or any movement activity of assets determined to be in the geographical location. For example, if an identified asset is in transit, the data processing computer device may determine that the particular asset may be excluded from subsequent analysis or action.

In some embodiments the telematics data may be received from user computer devices associated with particular assets. For example, if an asset is a vehicle, a driver and/or passengers within the vehicle may possess certain devices such as mobile phones that are equipped with GPS location devices and may transmit the location information across a network to the data processing computer device. Additionally or alternatively, geolocation telematics data received from user computer devices may be analyzed to determine whether other assets are at risk of harm. For example, if a user has registered with the data processing relocation alert system and identified a group of assets to be associated with the user, the data processing relocation alert system may determine that if certain identified assets are in transit, the stationary assets may be at risk.

In the exemplary embodiment the assets identified may be mobile vehicles (e.g. cars, boats, planes, etc.). In other embodiments the data processing relocation alert system may be configured to identify any number and type of ground craft, aircraft, watercraft, or spacecraft vehicles that may be relocated.

In some embodiments, the data processing relocation alert system may determine a value of the asset. The value of the asset may be based on a variety of factors such as the purchase price, age, quality, size, shape, market value, uniqueness and demand. In some embodiments the value of the asset may be determined by the insurance coverage policy. In other embodiments the value of the asset may be determined by the user. In some embodiments, the user may identify or determine a dollar amount upon registration with the data processing relocation alert system. In other embodiments, upon determination that an asset is located in an impact area, the data processing relocation alert system may initiate a communication with the user to determine a value. In some embodiments the data processing relocation alert system may retrieve from a database a recorded value. In some embodiments the recorded value may be updated according to current factors. For example, if the recorded value is recorded at a specific date, a formula for an amount of depreciation of the asset may be included in the valuation of the asset. In one embodiment, if an asset is determined to be a valuable asset, the data processing relocation alert system may initiate a relocation alert as described below. Alternatively, if an asset is determined to not be a valuable asset or if the data processing relocation alert system is unable to ascertain a value, the data processing relocation alert system may exclude the asset from further analysis and action. For example, the data processing relocation alert system may receive telematics data for an asset that has not been registered by a user with the data processing relocation alert system in which case the data processing relocation alert system may determine no action may be necessary. In some embodiments the data processing relocation alert system may determine an owner or responsible party for an asset whose value may be indeterminate or below a certain threshold. The data processing relocation alert system may then transmit a relocation alert to the owner and/or responsible party that the asset may be within the impact area. In other embodiments the data processing relocation alert system may transmit the relocation alert to the registered user.

In the exemplary embodiment, the data processing relocation alert system may identify at least one responsible party (e.g. the purchaser) for the identified valuable asset. In some embodiments, when a user registers with the data processing relocation alert system, the user may identify a responsible party for a valuable asset registered in the system. The responsible party may be a designated person responsible for the maintenance and management of the asset. In some embodiments, a plurality of persons may be identified as a responsible party for the asset. The data processing relocation alert system may be configured to order or rank the registered persons and initiate communication with the responsible parties in the order of the determined rank as described below. In some embodiments, the user registering the valuable asset may set the rank of the persons at the time of registration. In the one embodiment, the responsible party may be an individual capable of selecting options to configure the data processing computer device to determine relocation parameters. In some embodiments the registered user may identify a responsible party as a third-party service capable of configuring relocation parameters.

In some embodiments, the data processing relocation alert system may determine a score for the asset. The data processing relocation alert system may use a scoring system to determine a type of alert and/or content of the alert. In one embodiment, the data processing relocation alert system may assign a low, moderate, high, or very high score to an identified valuable asset. The data processing relocation alert system will use the score to determine a type of relocation alert to transmit or other action to execute for the specific valuable asset. In some embodiments, the data processing relocation alert system may initiate an action based on at least the determined score.

In the exemplary embodiment, the data processing relocation alert system may identify at least one safe area for relocation of the at least one valuable asset. In some embodiments, transmitting a relocation alert may include transmitting the location of the valuable asset to a responsible party and/or the owner and/or the registered user and transmitting the assessment for the geographical location. In some embodiments, additional information related to the safe area may also be provided (e.g. availability, location, distance, cost, etc.). In some embodiments, the responsible party may manually relocate the valuable asset to the safe area identified by the data processing relocation alert system. In some embodiments a plurality of safe areas may be presented to the responsible user. In these embodiments, the data processing relocation alert system may order or arrange the safe areas based on characteristics of the safe areas (e.g. availability, location, distance, cost, route to the location, presence of personnel, physical security, type of structure, safety of structure, etc.) and/or based on the assessment for the impact area.

In one embodiment, transmitting a relocation alert to a responsible party and/or the registered user may include the location of the valuable asset. In some embodiments, the data processing relocation alert system may be configured to receive a confirmation of receipt or acknowledgement by the responsible party. Alternatively or additionally, the data processing relocation alert system may receive a confirmation of receipt or acknowledgement by the registered user. In other embodiments, transmitting the relocation alert may include transmitting the assessment, predictions, and/or probabilistic analysis for the impact area. In some embodiments the transmitting may be via a text message, an e-mail, a telephone call, or other means of communication (for example, using wireless communication or data transmission over one or more radio links or digital communication channels such as the Internet).

In some embodiments, the data processing relocation alert system may automatically reserve a safe area for the valuable asset. In some embodiments, the data processing relocation alert system may include communicating with the user to determine a date and/or time period to relocate the valuable asset. In one embodiment, the responsible party may manually transport the valuable asset to the reserved safe area. In another embodiment a plurality of available times may be presented to the responsible party. The responsible party may then select a date and/or time to transport the valuable asset. In some embodiments, several reservations, including several different safe areas, may be presented to the responsible party. The responsible party may select a reservation for a particular safe area and transport the valuable asset at the reserved date and/or time.

In another embodiment, the data processing relocation alert system may include automatically relocating a valuable asset. The data processing relocation alert system may present the responsible party with at least one identified valuable asset for relocation. In some embodiments, a multitude of valuable assets may have been determined to be associated with the responsible party. For example, the registered user may have registered a plurality of valuable assets for relocation services at the time of registration. The list of valuable assets may be presented to the responsible party. The responsible party may then select a particular valuable asset for relocation. In some cases the responsible party may not wish to relocate a particular asset if, for example, the responsible party intends to relocate the valuable asset manually at a later time. In some embodiments the valuable asset may be an autonomous or semi-autonomous vehicle. The data processing relocation alert system may automatically initiate or engage autonomous transport of the autonomous vehicle to a safe area. In some embodiments the responsible party may be presented with a multitude of safe areas. The multitude of safe areas may be arranged as a list, grid, chart, or table. In some embodiments the multitude of safe areas may be re-arranged or filtered by, for example, availability, location, distance, cost, route to the location, presence of personnel, physical security, type of structure, or safety of structure. In some embodiments the registered user and/or responsible party may identify a preferred safe area. In some embodiments, data processing relocation alert system may be configured to automatically relocate a particular valuable asset to a safe area with a particular set of features (e.g. a covered structure).

In the exemplary embodiment, the data processing computer device may be in communication with a plurality of user computer devices that are used to interact with the data processing computer device. The user computer devices may be used by an identified responsible party and/or a registered user to configure the data processing computer device to identify and/or select a particular valuable asset, select a safe area for the relocation of the selected valuable asset, and schedule a relocation time for the valuable asset.

In the exemplary embodiment, the user may be in communication with an insurer using an insurer portal configured to access an insurer network. In the exemplary embodiment the user may configure insurance policy coverage to include data processing and relocation services for valuable assets. In the exemplary embodiment, the data processing computer device may retrieve asset information from the insurer using an insurer network (e.g. the value, vehicle identification number, serial number, location, size, weight, color, mobility, etc.). In some embodiments the asset information may be retrieved through other communication networks (e.g. the Internet). In some embodiments the insurer may have registered an insured party for data processing and relocation services with the data processing relocation alert system. The insurer will then transmit relevant information associated with the insured party to the data processing computer device. In some embodiments a user may use the insurer portal to further communicate with and configure the data processing computer device.

In the exemplary embodiment, a safe areas agent may be communicatively coupled to the data processing computer device. The safe areas agent may be a computer system or device configured to transmit to the data processing computer device a multitude of locations and characteristics of potential safe areas. For example, if a geographical location has been identified as an impact area, the safe areas agent may transmit an amount of available space that may accommodate valuable assets. In the exemplary embodiment, the data processing computer device may store the safe areas information in a database or memory storage space. In the exemplary embodiment the safe areas data may include information such as size, space, type, protection, cost, location, capacity, reservations, and available personnel.

In some embodiments, the valuable asset may be a vehicle. The data processing relocation alert system may automatically reserve a parking space in a safe area. The data processing computer device may be configured to cross-reference the location of the valuable asset with a list of available parking spaces stored in a database.

In another embodiment the data processing relocation alert system may alert a third-party to relocate a valuable asset. In some embodiments the third-party alert may include instructions on where to retrieve the valuable asset located in the impact area. In other embodiments the third-party alert may include instructions on the location of the safe area and/or where to relocate the valuable asset within the safe area.

In some embodiments, the data processing relocation alert system may retrieve at least a mobile identifier associated with the registered user and/or responsible party. The data processing computer device may determine a current location using, for example, a GPS device included in a mobile device associated with the mobile device identifier. In some embodiments, the data processing computer device may determine a location of the valuable asset within the impact area. The data processing relocation alert system may compare the location of the mobile device with the location of the valuable asset and determine that if the mobile device is not within a close proximity of the valuable asset, or if the distance between the mobile device and the valuable asset exceeds a certain threshold, that the valuable asset may need relocation services. In some embodiments, if the mobile device and valuable asset are determined to be within close proximity, the data processing relocation alert system may transmit a relocation alert to notify the registered user and/or responsible party of relocation options. The valuable asset may then be relocated manually and/or a user may arrange for automatic relocation using the data processing relocation alert system.

In another embodiment, the data processing computer device may be configured to prompt the registered user with safe location options. In some embodiments the data processing computer device may receive selections from the registered user. In other embodiments, the data processing computer device may relocate a valuable asset to a safe area based on user selections. In some embodiments the valuable asset may be an autonomous vehicle. The registered user may be prompted to provide an access code to access the autonomous vehicle wherein a driver may manually relocate the vehicle. In other embodiments, the registered user may be prompted to provide an access code to activate the autonomous vehicle and engage self-transport to a selected safe area. In some embodiments, the data processing computer device may transmit instructions to the autonomous vehicle for relocation to the safe area.

In some embodiments, the data processing relocation alert system may transmit a confirmation alert to an insurer associated with the registered user. In some embodiments, the confirmation alert may include an asset registered with the data processing relocation alert system. In other embodiments, the confirmation alert may include the safe area the valuable asset may have been relocated to. In some embodiments the data processing computer device may be configured to receive reservation data from the safe area including information such as the time period for which the valuable asset is to be stored, the date and time the valuable asset was delivered, the date and time the valuable asset is to be retrieved from the safe area, and characteristics of the safe area such as the type of protection provided.

Exemplary technical effects of the systems, methods, and computer-readable media described herein may include, for example: (a) storing profile data for a registered user including contact information, asset information, and location information of the asset; and (b) receiving geographic location data for an impact area for an impact area to compare with the stored profile data to identify assets in the impact area; (c) identifying safe areas for relocation of registered assets and transmitting relocation alerts to registered users.

Exemplary Data Processing and Relocation Alert System

FIG. 1 depicts an exemplary configuration view of user computer device 100 communicatively coupled with a data processing relocation alerts system. In some embodiments a user computer device 100 may be provided. In some embodiments, user computer device 100 may be a mobile device, a personal computer, a tablet, or a web page on another computer device. In the exemplary embodiment, user computer device 100 may be configured to receive relocation alert 110 from data processing computer device 210 (shown in FIG. 2). User computer device 100 may be configured to display relocation alert 110 indicating that user 220 (shown in FIG. 2) has been identified as a responsible party for identified valuable asset 270 (shown in FIG. 2). In the exemplary embodiment, the valuable asset may be a vehicle. In other embodiments the valuable asset may be another mobile asset that may be relocated such as an airplane, boat, or mobile home. Relocation alert 110 may also indicate that the valuable asset may be located within an impact area 280 (shown in FIG. 2). In some cases, relocation alert 110 may indicate that multiple assets are located within impact area 280. In some embodiments the data processing relocation alert system provides user 220 a confirmation for relocating identified valuable asset 270. Data processing computer device 210 may then allow user 220 to confirm, via computer device 100, that user 220 desires valuable asset 270 be relocated.

In the exemplary embodiment, user computer device 100 may be configured to display a list of assets 120 including identified valuable assets 270 associated with user 220. Data processing computer device 210 may allow user 220 to select, from the list of assets 120, a particular valuable asset 270 to be relocated. In some embodiments list of assets 120 may be filtered. List of assets 120 may be filtered by, for example, category, type, size, value, age, associated insurance policy coverage level, location, or name. In some embodiments, list of assets 120 may be configured such that user 220 may remove items from list of assets 120. Additionally or alternatively, data processing computer device 210 may allow user 220 to re-arrange the list of assets 120. In some embodiments, user computer device 100 may be configured to display additional information about valuable asset 270. For example, user 220 may press for an extended duration on a user interface to request additional information about valuable asset 270. Alternatively or additionally, data processing computer device 210 may allow user 220 to use additional pressure on the user interface of user computer device 100 to initiate additional informational display of valuable asset 270. In some embodiments, user 220 may execute multiple taps or clicks on user computer device at a specific location or at multiple locations to initiate additional informational display of valuable asset 270. Additionally or alternatively, other gestures such as prolonged eye contact of a particular valuable asset displayed on user computer device 100 may initiate additional informational display. In some embodiments the additional informational display may include information such as category, type, size, value, age, associated insurance policy coverage level, location, name, or recent activity. In the exemplary embodiment, user 220 may use user computer device 100 to select a particular valuable asset 270 that user 220 desires to relocate.

In the exemplary embodiment, data processing computer device may be configured to cause user computer device 100 to display a list of safe areas 130. List of safe areas 130 may be arranged by distance, availability, convenience, cost, or total size. In some embodiments, list of safe areas 130 may also be reconfigured by user 220 by gestures such as prolonged pressure, tapping, clicking, swiping and/or other gestures. Additionally or alternatively, user computer device 100 may be configured to display additional information pertaining to identified safe areas. In some embodiments, user 220 may remove identified safe areas from list of safe areas 130. In the exemplary embodiment, user 220 may select a safe area from a list of safe areas 130.

In the exemplary embodiment, user computer device 100 may be configured to display a list of dates 140 and list of times 150 for user 220 to select. In some embodiments the list of dates 140 and list of times 150 may be combined for display. In the exemplary embodiment, list of dates 140 may be displayed discretely and list of times 150 may be displayed thereafter. User 220 may select from a combination of dates 140 and times 150 to schedule a relocation period for valuable asset 270. In some embodiments, list of dates 140 and list of times 150 may be dynamically generated based on at least the availability of safe areas determined through a safe area agent 240 (shown in FIG. 2). In some embodiments user computer device may be configured to display additional information for each date or time in list of dates 140 and list of times 150. For example, certain gestures on user computer device may initiate a display of additional information such as the number of other users that have also selected the same date or time. In some embodiments, safe areas agent 240 may provide a block of times and dates to data processing computer device 210 to be converted into a useable format for user computer device 100. In the exemplary embodiment, user 220 selects a date from list of dates 140. User computer device 100 may be configured to thereafter display a list of times 150 that are available and for which user 220 may arrange for a relocation of valuable asset 270. User 220 may then select a specific time that may be convenient for user 220.

In the exemplary embodiment, user computer device 100 may be configured to display a schedule confirmation 160 of valuable asset 270 based on user's 220 configuration of data processing computer device 210 through user computer device 100. In the exemplary embodiment, schedule confirmation 160 may include the selected dates, times, and locations. In some embodiments, valuable asset 270 may be an autonomous or semi-autonomous vehicle and schedule confirmation 160 may indicate that valuable asset 270 will engage self-transport to the selected safe area at the selected date and time. In some embodiments additional information may be provided to user 220 such as previously selected information including location, identification of the asset to be relocated, duration of the relocation, and retrieval and/or return information.

In some embodiments if user 220 has declined relocation, canceled the configuration process, or if user 220 does not qualify for relocation services, user computer device 100 may be configured to terminate or end the configuration and relocation process.

Exemplary Process for Configuring Relocation of Assets

Figure 2:
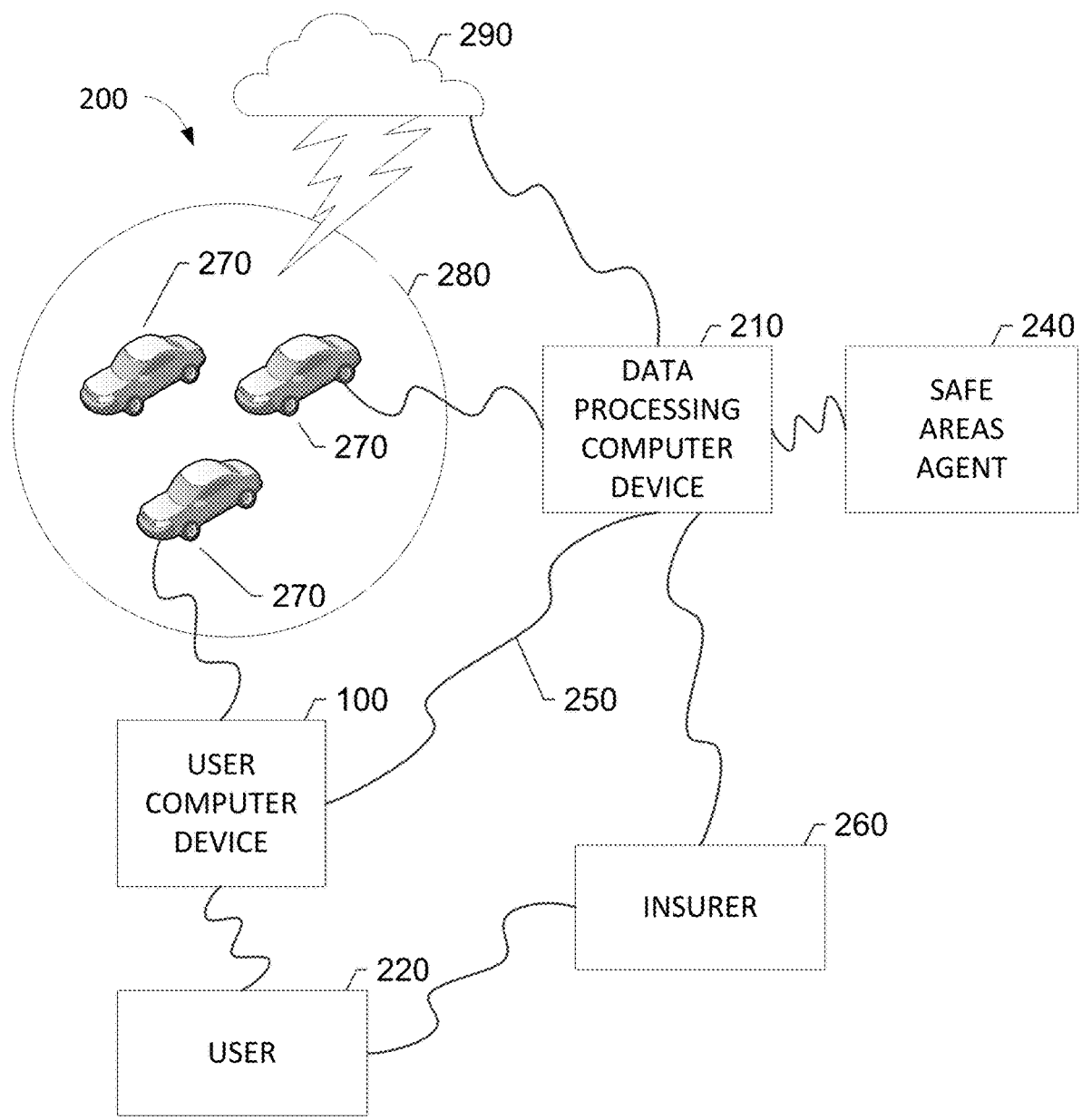
FIG. 2 illustrates a data flow diagram for an exemplary data processing computer device.

FIG. 2 depicts an exemplary configuration of a data processing computer device 210 in communication with components of data processing relocation alert system 200. In the exemplary embodiment, data processing computer device 210 may be in communication with safe areas agent 240, insurer 260, user computer device 100, and valuable asset 270. Additionally or alternatively data processing computer device 210 may be configured to receive current events data 290. Data processing computer device 210 may be configured to determine an impact area 280.

In the exemplary embodiment, data processing relocation alert system receives a plurality of current events data 290 from a plurality of sources (e.g. the National Weather Service, National Oceanic and Atmospheric Administration, United States Geological Survey, wildfire monitoring centers, etc.). In some embodiments, data processing computer device 210 may use current events data 290 to generate a model for a geographical location. Data processing computer device 210 may analyze the model for the geographical location to determine an assessment for the geographical location. The geographical location may be determined to be impact area 280. For example, impact area 280 may be under threat of flood, wildfire, hurricane, tornado, earthquake, volcano, tidal wave, or asteroid or meteor collision.

In the exemplary embodiment, data processing computer device may be in communication with valuable asset 270. In some embodiments the communication method may include the use of Global Positioning Systems (GPS) devices. In some embodiments, other methods of communication may also be used such as cellular, satellite, microwave, laser, radar, or any other method of wireless communication using the electromagnetic frequency spectrum or other media including sound, gravitational, or quantum. In some embodiments, valuable asset 270 may be configured to generate telematics data using GPS or other sensors mounted or installed on valuable asset 270. For example, valuable asset 270 may include sensors such as front view and/or side view cameras, LIDAR, radar, weight sensors, accelerometer, gyroscope, compass and/or other types of sensors to identify the location and/or position of valuable asset 270, surrounding objects, and/or internal objects or persons. Data processing computer device 210 may retrieve the telematics data to identify the location of valuable asset 270. Additionally or alternatively the telematics data may be used to correlate and/or corroborate the present conditions of the impact area 280. Additionally or alternatively, the telematics data may be used to determine the ability of valuable asset 270 to be relocated. For example, sensors located on the valuable asset may determine that accessible pathways are blocked. In the exemplary embodiment, the telematics data may be used to determine whether valuable asset 270 is located within impact area 280.

In some embodiments, valuable asset 270 may include autonomous or semi-autonomous vehicle-related functionality or technology that may be used with the present embodiments to replace human driver actions, which may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with valuable asset 270.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems While valuable asset 270 may be an automobile in the exemplary embodiment, in other embodiments, valuable asset 270 may be, but is not limited to, other types of ground craft, aircraft, watercraft, or spacecraft vehicles.

In some embodiments a score may be generated for valuable asset 270. In the exemplary embodiment, data processing computer device 210 determines a value for the valuable asset. The value of the asset may be based on a variety of factors such as the purchase price, age, quality, size, shape, market value, uniqueness and demand. In some embodiments the value of the asset may be determined by an insurance coverage policy. The data processing computer device 210 may generate a score based on at least the value of the asset. In some embodiments the additional sensor data may be used by data processing computer device 210 to determine the score for valuable asset 270. In some embodiments, data processing computer device 210 may use any of the above mentioned factors to determine the score for valuable asset 270. The generated score may be used to determine the available configuration options for user 220 using user computer device 100 as described herein.

In the exemplary embodiment, data processing computer device 210 may cause user computer device 100 to display available configurations. In the exemplary embodiment, data processing computer device 210 may use insurer network 250 to communicate with user computer device 100. Insurer network 250 may, for example, include at least part of the Internet, or include another communication network such as an insurance network. More specifically, user computer device 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 100 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurer network 250 may access database 420 to update the model. In other embodiments, insurer network 250 computer devices may access database 420 to adjust an insurance policy of an insurance holder (e.g., a responsible party). Moreover, insurer network 250 may specifically access database 420 to update real-time data on events in a geographical location.

In some embodiments, user computer device 100 receives the available configurations and transmits, based on input from user 220, selections identifying at least a confirmation of acknowledgement from user 220 that, as a responsible party associated with a particular asset, potential harm to assets located within the impact area has been received. In some embodiments, depending on the score generated for an identified asset in impact area 280, user 220 may be presented with configuration options for selecting valuable asset 270 amongst a plurality of valuable assets 270. In some embodiments, user computer device 100 may be in communication with valuable asset 270 and may communicate certain commands to valuable asset 270. For example, user 220 may wish to unlock valuable asset 270 and/or disable alarm or security systems for valuable asset 270 to allow an identified person to access valuable asset 270 to manually relocate valuable asset 270. In some embodiments, granting access to valuable asset 270 may include at least a code, keyword, passphrase, or biometric data.

In the exemplary embodiment, user 220 may be in communication with an insurer 260 to verify or configure insurance coverage policy levels. The insurance coverage policy levels may be used to determine the available options for relocation for a particular asset. Data processing computer device 210 may then receive updated information from insurer 260 and identify assets associated with user 220. Alternatively or additionally, insurer 260 may identify user 220 as at least one responsible party for identified valuable asset 270. Insurer 260 may also communicate additional information to data processing computer device 210 to be used to generate a score for valuable asset 270.

In the exemplary embodiment, data processing computer device 210 may be in communication with a safe areas agent 240 to identify available safe areas for assets. Some information that safe areas agent 240 may transmit to data processing computer device 210 may include characteristics of the particular location such as size, space, type, protection, cost, location, capacity, reservations, and available personnel. In some embodiments, safe areas agent 240 may be an automated device or a computer system in connection with at least one database storing at least the location and related information described above.

In the exemplary embodiment, current events data 290 may include data related to natural phenomena such as weather, volcanic activity, geological activity, and oceanographic. In some embodiments, current events data 290 may include other forms of data such as social media data, political news information, animal migratory patterns, health related data including viral and bacterial contagion rates from organizations such as the World Health Organization, or data pertaining to pests, rodents, and insects, and astronomical phenomenon such as solar flares.

Figure 3:
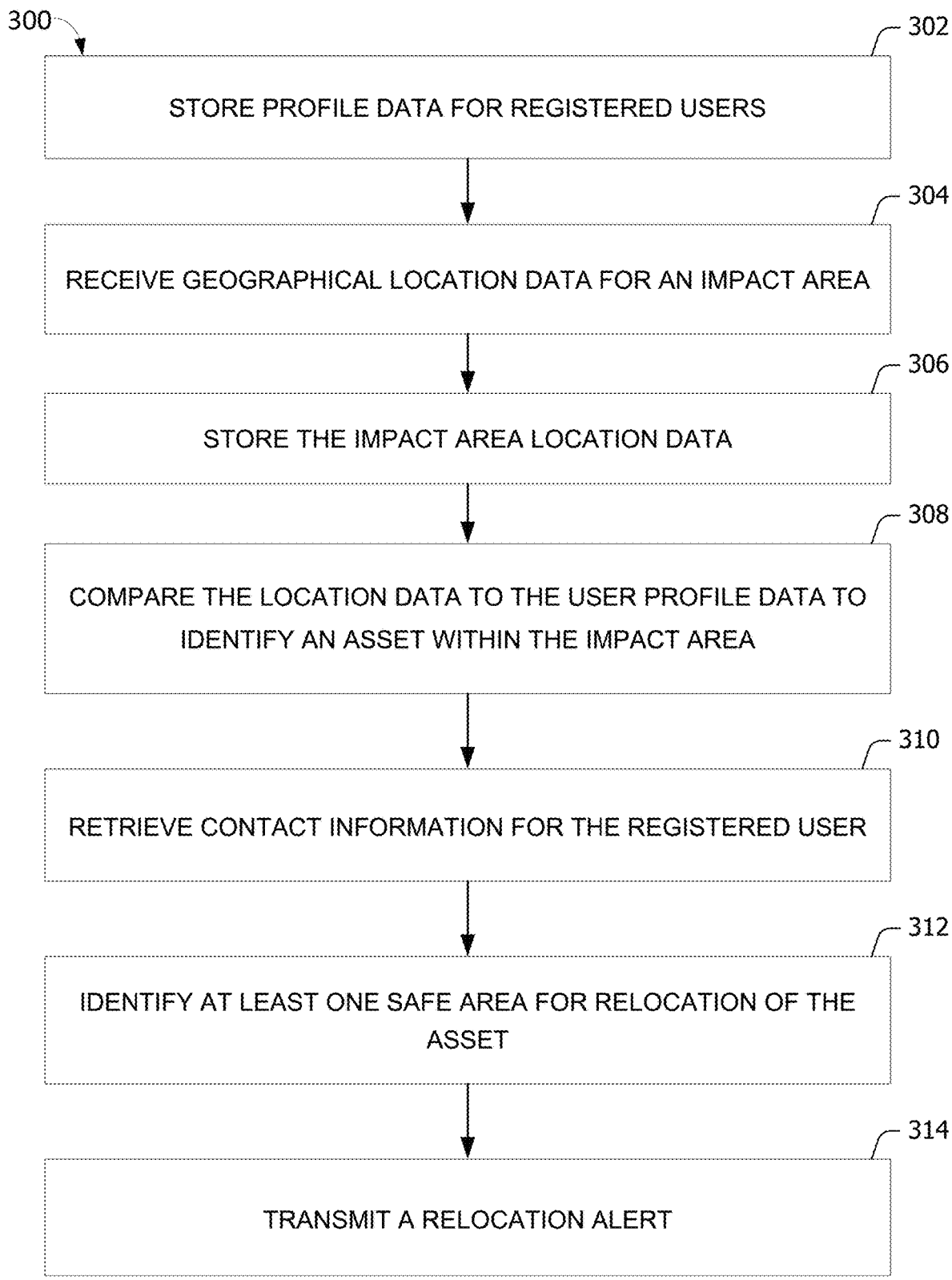
FIG. 3 illustrates a flow chart of an exemplary computer-implemented process for one aspect of data processing and relocation as shown in FIG. 1.

Exemplary Computer-Implemented Method for Data Processing and Providing Relocation Alerts FIG. 3 illustrates a flow chart of an exemplary computer-implemented process 300 for data processing and providing relocation alerts. Process 300 may be implemented by a computing device, for example, data processing computer device 210 (shown in FIG. 2). In the exemplary embodiment, data processing computer device may be in communication with a user computer device 100 (shown in FIG. 2), a safe areas agent 240 (shown in FIG. 2), at least one valuable asset 270 (shown in FIG. 2), and a plurality of current events data 290 (shown in FIG. 2).

In the exemplary embodiment, the data processing computer device 210 may receive profile data from a registered user. Data processing computer device 210 may store 302 profile data for registered users. In some embodiments the profile data may include information associated with at least one asset such as type, size, weight, mobility, value, and location.

In the exemplary embodiment, process 300 may include receiving 304 geographical location data for an impact area. In some embodiments, the geographical location data may be converted into a uniform format for processing. For example, relationships between the disparate data sets may be correlated with one another through a single or multiple key values such as time and location. The re-organization of the data may facilitate efficient and immediate access for analysis and interpretation. Additionally or alternatively, the geographical location data may be accessed in real-time and/or updated based on new data in real-time to dynamically update the assessment for a geographical location. In the exemplary embodiment, a model may be generated using the geographical location data. The model may be used to simulate a current state of the geographical location. Additionally or alternatively, the model may be used to predict a likely or potential outcome for the geographical location. For example, the geographical location may receive weather data related to hurricanes. A predicted path for the hurricane may be analyzed with other data such as wind speed. In the some embodiments, the data processing computer device 210 may analyze the model to determine an assessment for the impact area. In some embodiments, the data processing computer device 210 may designate a geographical location an impact area if characteristics of the model or threshold values are exceeded. In the exemplary embodiment, data processing computer device 210 may be configured to store 306 the impact area location data. The location data may be stored in at least one database or in a distributed database. In some embodiments the location data may include coordinates such as latitude and longitude. In some embodiments the location data may include names of cities, towns, or neighborhoods in the impact area. In some embodiments the location data may include street names.

In the exemplary embodiment, data processing computer device 210 may locate an asset in the geographical location by comparing 308 the received geographical location data to the user profile data. The data processing computer device 210 may use geolocation telematics data to identify and locate assets in the geographical location. More specifically, data processing computer device 210 may use geolocation devices such as GPS to locate assets in the geographical region. In some embodiments the telematics data may be received from devices installed or affixed to the particular asset. In some embodiments the telematics data may be derived from mobile devices equipped with GPS devices but are located near, on, or in the asset. For example, if valuable asset 270 is a vehicle, a driver and/or passengers within the vehicle may possess certain devices such as mobile phones that are equipped with GPS location devices and may transmit the location information across a network to data processing computer device 210. In such embodiments the data processing system may retrieve profile data of registered users to identify whether the mobile phones are associated with a registered asset. The data processing computer device 210 may retrieve a mobile device identifier stored in a database and compare the mobile device identifier with the received GPS location device data.

In the exemplary embodiment, data processing computer device 210 may retrieve 310 contact information for the registered user. In some embodiments, data processing computer device 210 may retrieve a user identifier associated with a user computer device. In some embodiments the contact information may include an e-mail address, telephone number, mailing address, or social media account names. In some embodiments, data processing computer device 210 may be configured to identify a responsible party for valuable asset 270. In some embodiments, user 220 (shown in FIG. 2) may have registered with data processing computer device 210 for data processing and relocation alert services. In some embodiments, user 220 may have directed insurer 260 to identify user 220 as a responsible party for valuable asset 270. In other embodiments, data processing computer device 210 may access a database to obtain information related to valuable asset 270 including at least ownership information. In some embodiments, data processing computer device 210 may use a network to access the database containing information identifying the responsible party. In some embodiments if a responsible party is identified, data processing computer device 210 may retrieve contact information for the identified responsible party and/or the registered user.

In the exemplary embodiment, data processing computer device 210 may be configured to identify 312 a safe area for relocation of valuable asset 270. In some embodiments, data processing computer device 210 may determine a value for the asset. The value of the asset may be based on a variety of factors such as the purchase price, age, quality, size, shape, market value, cost, depreciation, uniqueness and demand. In some embodiments associated insurance policy coverage level may also be included in determining the value. In some embodiments the value of the asset may be used to determine a safe area for relocation.

In some embodiments, data processing computer device 210 may determine a score for the asset. The score may be used to determine the available options for user 220. In some embodiments the score may be determined using factors such as the market value of valuable asset 270, cost of valuable asset 270, location of valuable asset 270, distance to safe areas, insurance coverage policy, and the assessment for the geographical location.

In the exemplary embodiment, data processing computer device 210 may be configured to transmit 314 a relocation alert. In some embodiments the relocation alert may be transmitted to user 220. In some embodiments the relocation alert may be transmitted to an identified responsible party. In some embodiments, transmitting 314 a relocation alert may include the location of valuable asset 270. Additionally or alternatively, transmitting 314 a relocation alert may include transmitting the impact area. In some embodiments transmitting 314 a relocation alert may be in the form of a text message, e-mail, telephone call, letter, or any combination thereof. In some embodiments transmitting 314 a relocation alert may be through an app on a mobile phone, web page, website, or method of communication using a wireless or other communication device such as a radio.

In some embodiments, transmitting 314 a relocation alert may include at least transmitting to user 220 at least one safe area in the form of a list, grid, table, or chart. In some embodiments, data processing computer device 210 may cause user computer device 100 to display the list of safe areas. In some embodiments the list of safe areas may be categorized, grouped, or arranged by characteristics of the particular location such as size, space, type, protection, cost, location, capacity, reservations, and available personnel. In some embodiments, identifying 312 a safe area may include retrieving aspects of the safe area such additional protection such as covered garages, structures with security systems, structures identified as capable of withstanding certain natural disasters, whether the safe area is an indoor facility, and number of personnel available at the location. In some embodiments transmitting 314 a relocation alert may include transmitting the aspects of the safe area.

In some embodiments, transmitting 314 a relocation alert may include automatically reserving an appropriate safe area for the valuable asset. Additionally or alternatively, transmitting 314 a relocation alert may include determining at least one safe area appropriate for the valuable asset by presenting to user 220 a selection. In some embodiments a plurality of reservations and a plurality of scheduled times may be provided to user 220. User 220 may manually relocate valuable asset 270 to a selected safe area.

In some embodiments, transmitting 314 a relocation alert may include at least directing a courier or other means of manually relocating valuable asset 270 and/or, if valuable asset 270 has and/or is capable of autonomous movement, data processing computer device may cause valuable asset 270 to initiate or engage automatic autonomous transport to the reserved safe area. In some embodiments, user 220 may be presented with choices for additional safe areas for additional protection such as covered garages, structures with security systems, structures identified as capable of withstanding certain natural disasters.

Exemplary Computer Network

Figure 4:
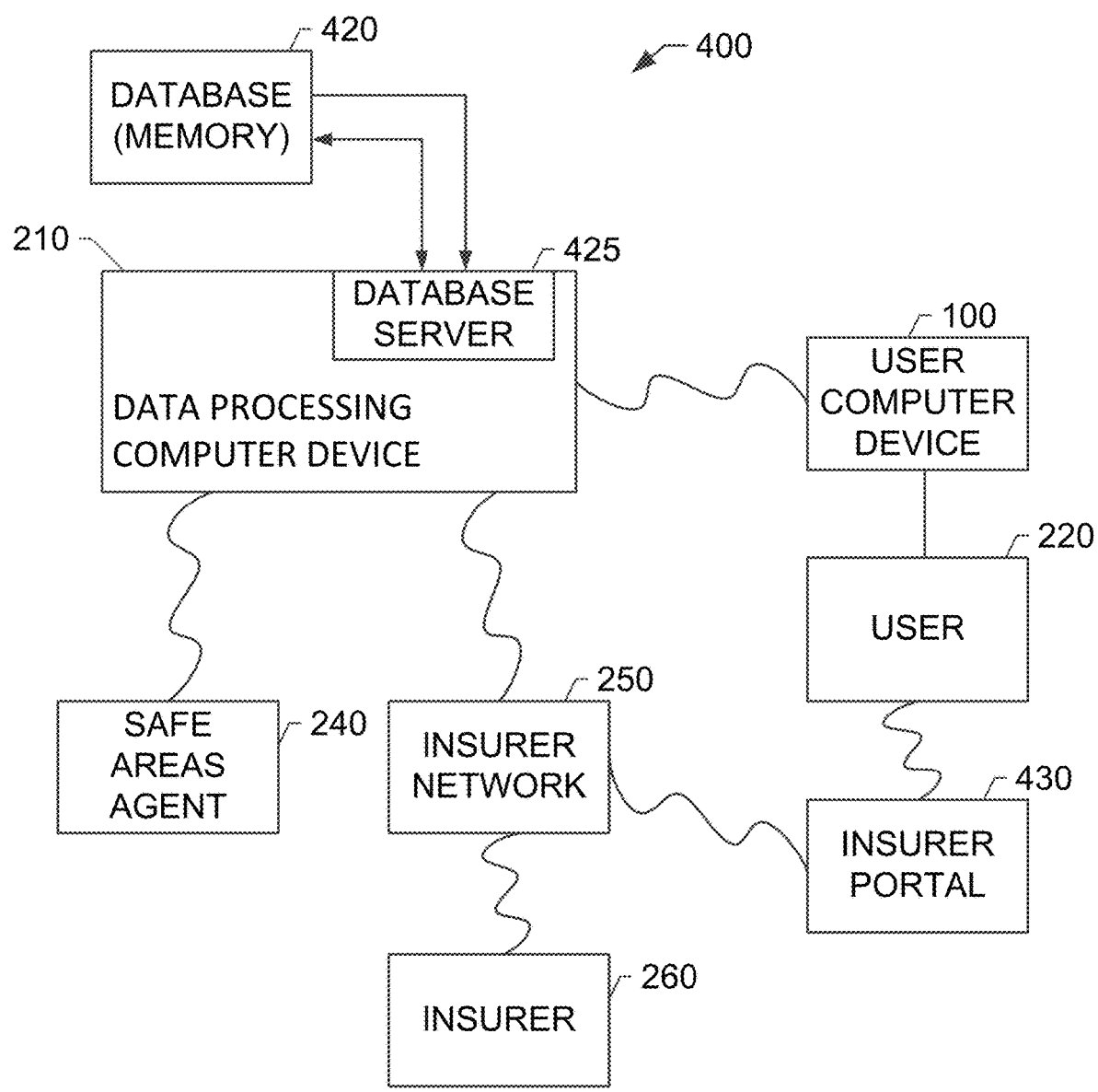
FIG. 4 illustrates a simplified block diagram of an exemplary computer system for implementing the process shown in FIG. 1.

FIG. 4 depicts a simplified block diagram of an exemplary system 400 for implementing process 300 (shown in FIG. 3). In the exemplary embodiment, system 400 may be used for data processing and providing relocation alerts. As described below in more detail, a data processing computer device 210 (shown in FIG. 2) may be configured to (i) store profile data for registered users; (ii) receive geographical location data for an impact area; (iii) store the impact area location data; (iv) compare the location data to the user profile data to identify an asset within the impact area; (v) retrieve contact information; and (vi) identify a safe area for relocation of the asset.

In some embodiments, user computer device 100 (shown in FIG. 2) may be a computer that includes a web browser or a software application which enables user computer device 100 to access remote computer devices, such as data processing computer device 210 using the Internet or other network as described herein. More specifically, user computer device 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 100 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment a user 220 (shown in FIG. 2) may be in communication with an insurer portal 430. Insurer portal 430 may be communicatively coupled to an insurer 260 through an insurer network 250. In some embodiments, an insurer 260 may be associated with user 220, who has an insurance policy with insurer 260. In some embodiments, insurer 260 may communicate with user 220 through insurer portal 430. In some embodiments, insurer portal 430 may be a web page or website. In other embodiments, user computer device 100 may be communicatively coupled to insurer portal 430. User 220 may initiate a communication with insurer portal 430 through user computer device 100. In yet another embodiment, insurer portal 430 may be communicatively coupled with data processing computer device 210.

Data processing computing device 210 may be part of a server system which includes database server 425. Database server 425 may be communicatively coupled to a database 420 that stores data. In the exemplary embodiment, database 420 is stored locally on data processing computer device 210. In an alternative embodiment, database 420 may be stored remotely from data processing computer device 210 and may or may not be decentralized. In the exemplary embodiment, user 220, may access database 420 via user computer device 100 by logging onto data processing computer device 210 as described herein.

Data processing computer device 210 may be communicatively coupled with one or more user computer devices 100. In some embodiments, data processing computer device 210 may also be communicatively coupled with safe areas agent 240. In some embodiments, data processing computer device 210 may be associated with, or may be part of a computer network associated with an insurance provider, or in communication with insurance network 250. In some embodiments, insurer network 250 may be in communication with insurer 260. In other embodiments, data processing computer device 210 may be associated with a third party and may merely be in communication with the insurance provider's computer network. More specifically, data processing computer device 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Exemplary Client Device

Figure 5:
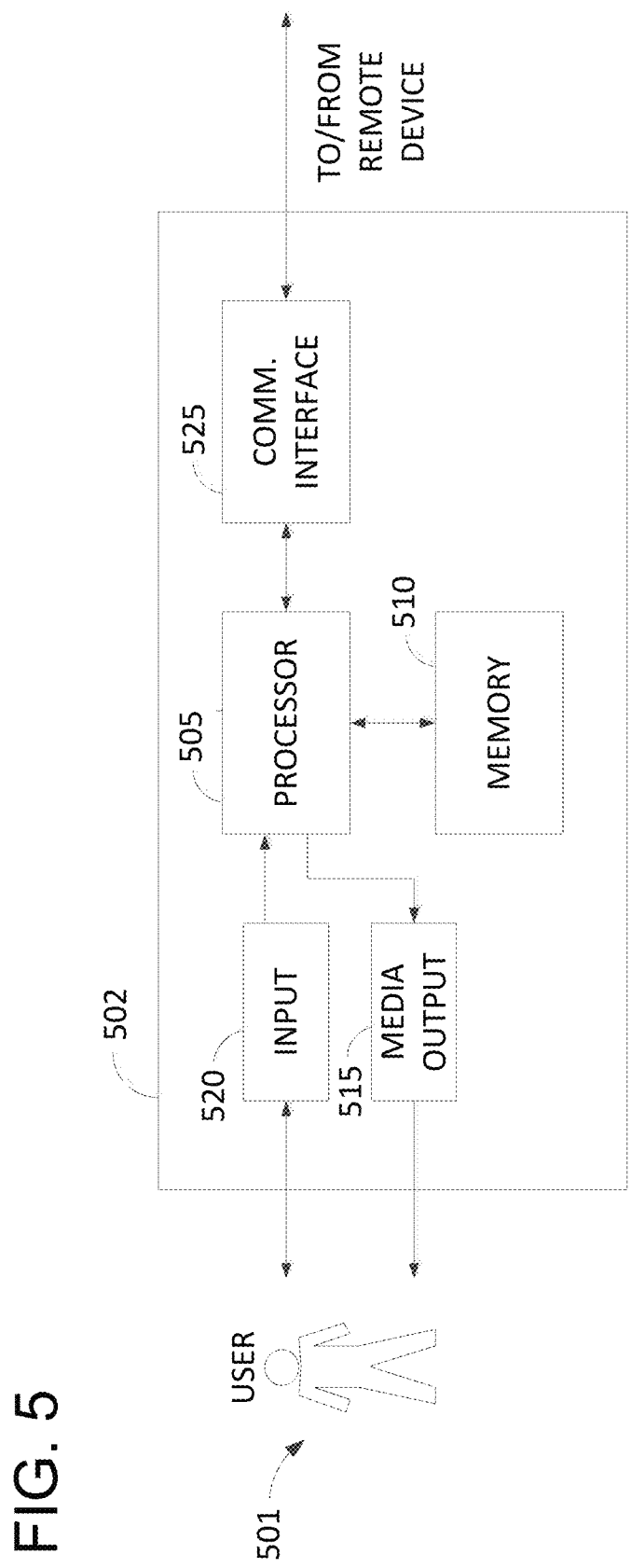
FIG. 5 illustrates an exemplary configuration of a client computer device shown in FIG. 1, in accordance with one embodiment of the present disclosure.

FIG. 5 depicts an exemplary configuration of a user computing device 502, such as user computer device 100 (shown in FIG. 2), in accordance with one embodiment of the present disclosure. User computer device 502 may be operated by a user 501. User computer device 502 may include, but may not be limited to, user computer devices 100 or data processing computer device 210 (both shown in FIG. 2). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, select and/or enter one or more items about safe areas, reservations, and/or relocation times and dates.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as data processing computer device 210 or insurer network 250 (shown in FIG. 2). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from data processing computer device 210. For example, instructions may be stored by a cloud service, and the output of the execution of the instructions sent to the media output component 515.

Exemplary Server Device

Figure 6:
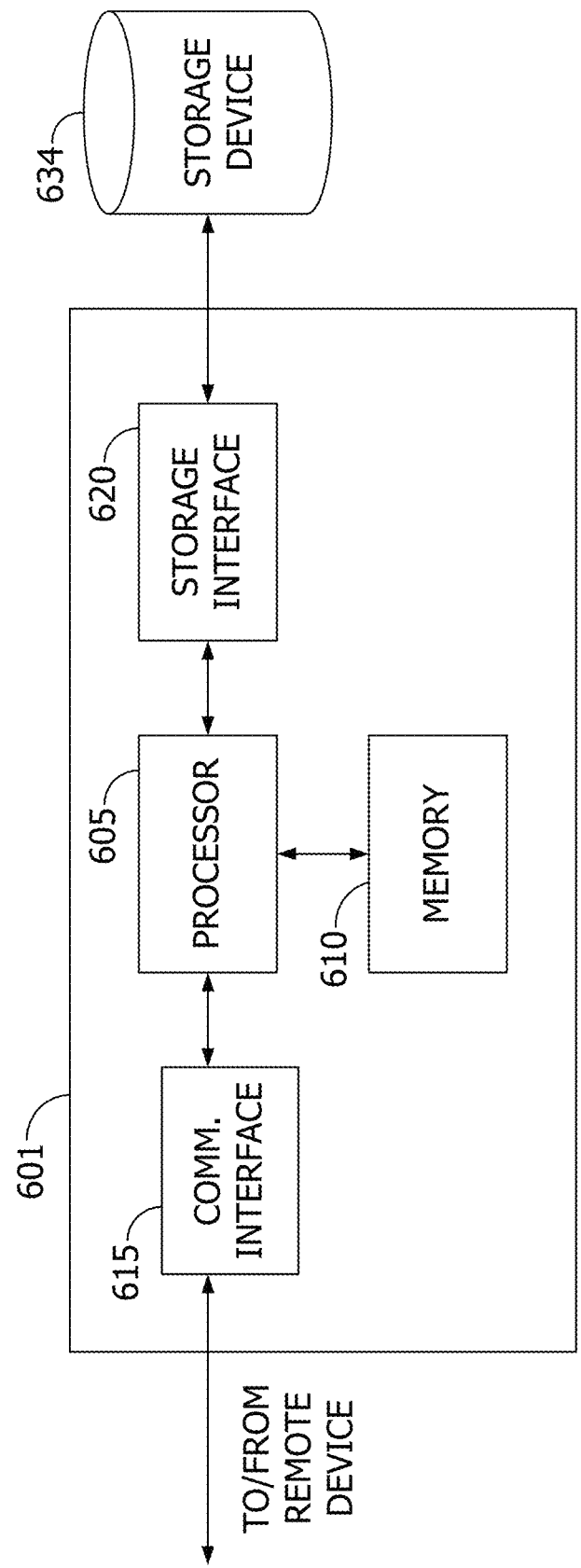
FIG. 6 illustrates an exemplary server configuration of a data processing computer device as shown in FIG. 2, in accordance with one embodiment of the present disclosure.

FIG. 6 depicts an exemplary configuration 600 of a server computer device 601, in accordance with one embodiment of the present disclosure. In the exemplary embodiment, server computer device 601 may be similar to, or the same as, data processing computer device 210 (shown in FIG. 1). Server computing device 601 may include, but may not be limited to, data processing computer device 210, insurer network 250 (shown in FIG. 2), and database server 425 (shown in FIG. 4). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 may be capable of communicating with a remote device such as another server computer device 601, data processing computer device 210, and user computer devices 100 (shown in FIG. 2) (for example, using wireless communication or data transmission over one or more radio links or digital communication channels. For example, communication interface 615 may receive requests from user computer devices 100 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIG. 3.

Exemplary Computer Device

Figure 7:
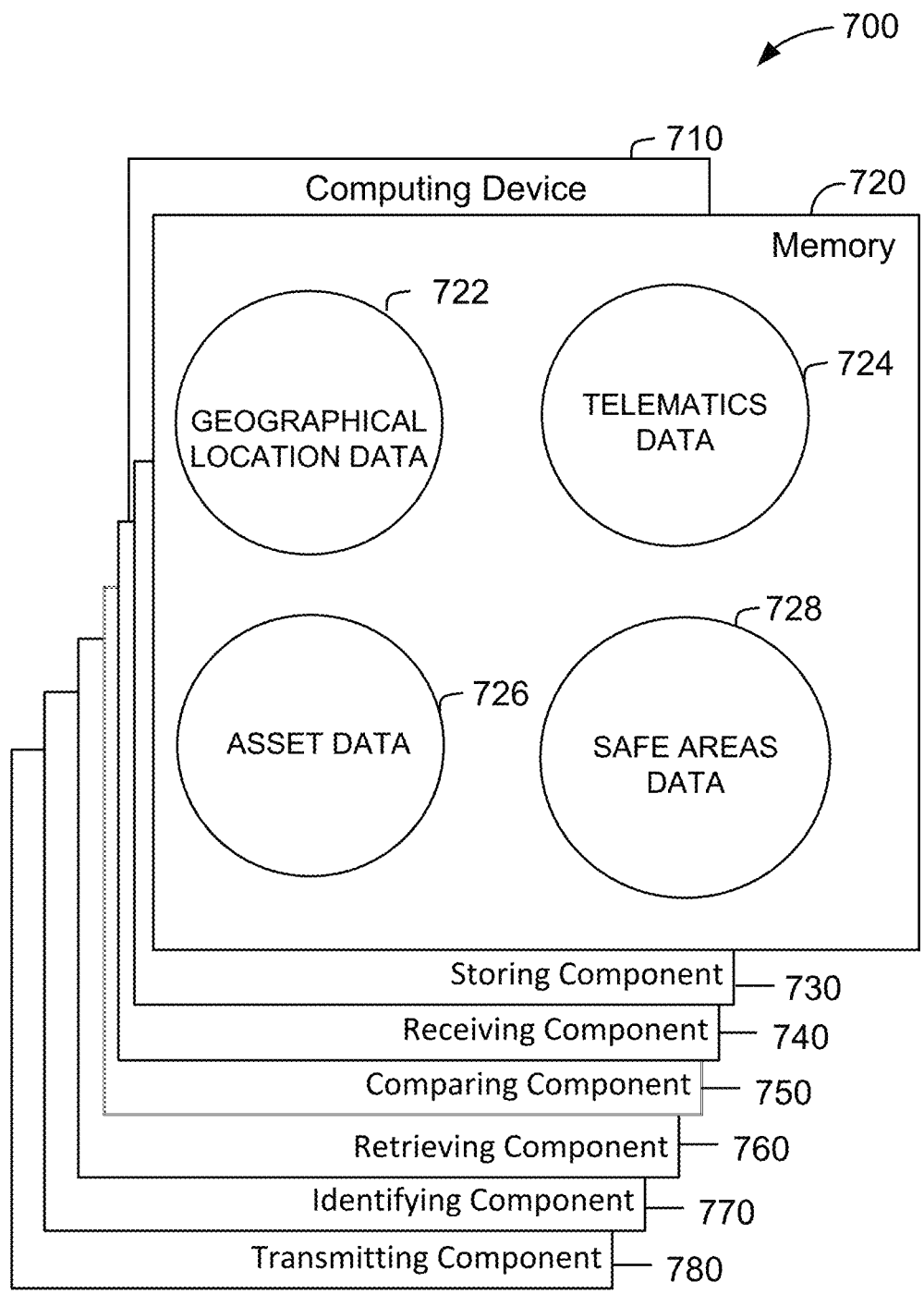
FIG. 7 illustrates a diagram of components of one or more exemplary computing devices that may be used in the system shown in FIG. 1.

FIG. 7 depicts a diagram 700 of components of one or more exemplary computing devices 710 that may be used in system 400 (shown in FIG. 4). In some embodiments, computing device 710 may be similar to data processing computer device 210 (shown in FIG. 2). Memory 720 may be coupled with several separate components within computing device 710, which perform specific tasks. In the exemplary embodiment, memory 720 may include geographical location data 722, telematics data 724, asset data 726, and/or safe areas data 728. In some embodiments, memory 720 may be similar to database 420 (shown in FIG. 4).

Computing device 710 may include the memory 720, as well as a storing component 730 for storing profile data for registered users and/or impact area location data. Computing device 710 may also include a receiving component 740 for receiving geographical location data 722 for an impact area. Computing device 710 may further include a comparing component 750 for determining whether an asset may be in the geographical location using at least telematics data 724, asset data 726, and the stored profile data. Computing device 710 may include a retrieving component 760 for retrieving contact information to inform the registered user and/or a responsible party. Computing device 710 may also include an identifying component 770 to determine the available options for relocation. Computer device 710 may also include a transmitting component 780 to communicate with other internal and/or external components to at least transmit the result of comparing component 750. In some embodiments, transmitting component 780 may also transmit at least safe areas data 728 and/or reservation information.

Exemplary Embodiments & Functionality

In one aspect, a data processing relocation alert system for identifying areas that may be affected by disaster or catastrophic events, identifying valuable assets in an impact area utilizing geolocation telematics, and transmitting relocation alerts may be provided. The data processing relocation alert system may include at least one processor in communication with at least one database. The data processing relocation alert system may be configured to: (i) store profile data for registered users including at least a user identifier, contact data, at least one asset identifier, and an asset location; (ii) receive geographical location data for an impact area; (iii) store the impact area location data in at least one database; (iv) compare the impact area location data to the registered user profile data to identify at least one registered asset located within the impact area; (v) retrieve contact information of impacted registered users based on the comparing; (vi) identify at least one safe area for relocation of the at least one registered asset; (vii) transmit a relocation alert using the contact information.

In a further enhancement, the asset is an autonomous vehicle that engages automatic transport to the at least one safe area. In another enhancement, the asset is a vehicle, and a parking space located within the at least one safe area is identified by cross-referencing the asset location data within a list of available parking spaces stored in the database and automatically reserved.

In another enhancement, the data processing relocation alert system determines that the at least one registered asset has been abandoned. In a further enhancement, the data processing and relocation alert system retrieves a mobile identifier associated with the at least one registered asset, determines the current location of a mobile device associated with the mobile identifier, determines a current location of the asset, and compares the locations of the mobile device and the asset to determine if the asset has been abandoned.

In a further enhancement, the relocation alert is transmitted to a user device associated with the registered user and includes directions to the safe area. In yet another enhancement, the user receives a prompt of safe location options, selects a safe area, and the system relocates the asset to the selected safe area. In a further enhancement, the asset is an autonomous vehicle and the user is further prompted to provide a vehicle access code to allow automatic engagement of self-transport to the selected safe area.

In a further enhancement, a reservation time period for relocation is received from the registered user. In yet another enhancement, the reservation time period for relocation is transmitted to the safe area.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device, driver, and/or vehicle from device details, mobile device sensors, geolocation information, image data, and/or other data.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify if the vehicle is traveling based upon minimal information or despite a lack of updates from a user. The processing element may also learn how to identify different types of routes and/or driver behaviors based upon differences in the received sensor data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A data processing system for providing relocation alerts, the data processing system comprising:
    at least one processor; and
    at least one database in communication with said at least one processor, said at least one processor programmed to:
        store profile data for a registered user, the profile data including at least a user identifier, contact data, at least one asset identifier associated with the user identifier, and an asset location for the at least one asset identifier;
        receive geographical location data for an impact area;
        store the impact area location data in the at least one database;
        compare the impact area location data to the registered user profile data to identify at least one registered asset located within the impact area;
        retrieve the contact data for the registered user associated with the at least one registered asset based on the comparison, the contact data including a user device identifier for a user computer device associated with the registered user;
        retrieve an insurance coverage level for the at least one registered asset;
        determine, based on the insurance coverage level, at least one safe area for relocation of the at least one registered asset; and
        transmit a relocation alert to the user computer device using the contact data, wherein the relocation alert i) identifies the at least one safe area, ii) provides directions to the at least one safe area, and iii) prompts the registered user to input an indication of whether the at least one registered asset would be relocated to the at least one safe area.

2. The data processing system of claim 1, wherein the at least one registered asset is an autonomous vehicle, and wherein the at least one processor is further programmed to cause the autonomous vehicle to engage automatic self-transport to travel from the impact area to the at least one safe area.

3. The data processing system of claim 1, wherein the at least one registered asset is a vehicle, and wherein the at least one processor is further programmed to automatically reserve a parking space located within at least part of the at least one safe area by cross-referencing the asset location data within a list of available parking spaces stored in the at least one database.

4. The data processing system of claim 1, wherein the at least one processor is further programmed to alert a third-party and instruct the third-party on where to locate the at least one registered asset within the impact area, and where to relocate the at least one registered asset within the at least one safe area.

5. The data processing system of claim 1, wherein the at least one registered asset is communicatively coupled to a GPS, and wherein the at least one processor is further programmed to determine a location of the at least one registered asset using at least the GPS.

6. The data processing system of claim 5, wherein the at least one processor is further programmed to:
    retrieve at least one mobile device identifier associated with the at least one registered asset;
    determine a current location of at least one mobile device associated with the at least one mobile device identifier;
    determine a current location of the at least one registered asset;
    compare the current location of the at least one mobile device with the current location of the at least one registered asset, wherein:
    when the current location of the at least one mobile device is within a certain distance of the current location of the one registered asset, transmit the relocation alert using the contact data; and
    when the current location of the at least one mobile device is not within the certain distance of the current location of the one registered asset, prompt the registered user to determine if the registered user desires relocation of the at least one registered asset.

7. The data processing system of claim 1, wherein the at least one processor is further configured to:
    prompt the registered user with safe location options;
    receive from the registered user a selected safe area; and
    relocate the at least one registered asset to the selected safe area.

8. The data processing system of claim 7, wherein the at least one registered asset is an autonomous vehicle, and wherein the at least one processor is further programmed to:

prompt the registered user to provide a vehicle access code;

automatically engage the autonomous vehicle using the vehicle access code; and transmit instructions to the autonomous vehicle for relocation to the selected safe area.

9. The data processing system of claim 1, wherein the at least one processor is further configured to transmit a confirmation alert to an insurer associated with the registered user, the confirmation alert including at least the at least one registered asset and the at least one safe area.

10. At least one non-transitory computer-readable storage medium having computer-executable instructions for processing data and providing relocation alerts embodied thereon, wherein when executed by a data processing computer device including at least one processor in communication with at least one database, the computer-executable instructions cause the at least one processor to:

store profile data for a registered user, the profile data including at least a user identifier, contact data, at least one asset identifier associated with the user identifier, and an asset location for the at least one asset identifier;

receive geographical location data for an impact area;

store the impact area location data in at least one database;

compare the impact area location data to the registered user profile data to identify at least one registered asset located within the impact area;

retrieve the contact data for the registered user associated with the at least one registered asset based on the comparison, the contact data including a user device identifier for a user computer device associated with the registered user;

retrieve an insurance coverage level for the at least one registered asset;

determine, based on the insurance coverage level, at least one safe area for relocation of the at least one registered asset; and transmit a relocation alert to the user computer device using the contact data, wherein the relocation alert i) identifies the at least one safe area, ii) provides directions to the at least one safe area, and iii) prompts the registered user to input an indication of whether the at least one registered asset would be relocated to the at least one safe area.

11. The at least one non-transitory computer-readable storage medium of claim 10, wherein the at least one registered asset is an autonomous vehicle, and wherein the computer-executable instructions further cause the at least one processor to cause the autonomous vehicle to engage automatic self-transport to travel from the impact area to the at least one safe area.

12. The at least one non-transitory computer-readable storage medium of claim 10, wherein the at least one registered asset is a vehicle, and wherein the computer-executable instructions further cause the at least one processor to automatically reserve a parking space located within at least part of the at least one safe area by cross-referencing the asset location data within a list of available parking spaces stored in the at least one database.

13. The at least one non-transitory computer-readable storage medium of claim 10, wherein the computer-executable instructions further cause the at least one processor to alert a third-party and instruct the third-party on where to locate the at least one registered asset within the impact area, and where to relocate the at least one registered asset within the safe area.

14. The at least one non-transitory computer-readable storage medium of claim 10, wherein the at least one registered asset is communicatively coupled to a GPS, and wherein the computer-executable instructions further cause the at least one processor to determine a location of the at least one registered asset using at least the GPS.

15. The at least one non-transitory computer-readable storage medium of claim 14, wherein the computer-executable instructions further cause the at least one processor to:

retrieve at least one mobile device identifier associated with the at least one registered asset;

determine a current location of at least one mobile device associated with the at least one mobile device identifier;

determine a current location of the at least one registered asset; and compare the current location of the at least one mobile device with the current location of the at least one registered asset, wherein:

when the current location of the at least one mobile device is within a certain distance of the current location of the one registered asset, transmit the relocation alert using the contact data; and when the current location of the at least one mobile device is not within the certain distance of the current location of the at least one registered asset, prompt the registered user to determine if the registered user desires relocation of the at least one registered asset.

16. The at least one non-transitory computer-readable storage medium of claim 10, wherein the computer-executable instructions further cause the at least one processor to:

prompt the registered user with safe location options;

receive from the registered user a selected safe area; and relocate the at least one registered asset to the selected safe area.

17. The at least one non-transitory computer-readable storage medium of claim 16, wherein the at least one registered asset is an autonomous vehicle, and wherein the computer-executable instructions further cause the at least one processor to:

prompt the registered user to provide a vehicle access code;

automatically engage the autonomous vehicle using the vehicle access code; and transmit instructions to the autonomous vehicle for relocation to the selected safe area.

18. The at least one non-transitory computer-readable storage medium of claim 10, wherein the computer-executable instructions further cause the at least one processor to transmit a confirmation alert to an insurer associated with the registered user, the confirmation alert including at least the at least one registered asset and the at least one safe area.

19. A computer-implemented method for processing data and providing relocation alerts, the method implemented using a data processing computer device including at least one processor in communication with at least one database, the computer-implemented method comprising:

storing profile data for a registered user, the profile data including at least a user identifier, contact data, at least one asset identifier associated with the user identifier, and an asset location for the at least one asset identifier;

receiving geographical location data for an impact area;

storing the impact area location data in the at least one database;

comparing the impact area location data to the registered user profile data to identify at least one registered asset located within the impact area;

retrieving the data for the registered user associated with the at least one registered asset based on the comparison, the contact data including a user device identifier for a user computer device associated with the registered user;

retrieving an insurance coverage level for the at least one registered asset;

determining, based on the insurance coverage level, at least one safe area for relocation of the at least one registered asset; and transmitting a relocation alert to the user computer device using the contact data, wherein the relocation alert i) identifies the at least one safe area, ii) provides directions to the at least one safe area, and iii) prompts the registered user to input an indication of whether the at least one registered asset would be relocated to the at least one safe area.

20. The computer-implemented method of claim 19, wherein the at least one registered asset is an autonomous vehicle, and wherein the method further comprises causing the autonomous vehicle to engage automatic transport to travel from the impact area to the at least one safe area.

21. The computer-implemented method of claim 19, wherein the at least one registered asset is a vehicle, and wherein the method further comprises automatically reserving a parking space located within at least part of the at least one safe area by cross-referencing the asset location data within a list of available parking spaces stored in the at least one database.

22. The computer-implemented method of claim 19, further comprising alerting a third-party and instructing the third-party on where to locate the at least one registered asset within the impact area, and where to relocate the at least one registered asset within the at least one safe area.

23. The computer-implemented method of claim 19, wherein the at least one registered asset is communicatively coupled to a GPS, and wherein the method further comprises determining a location of the at least one registered asset using at least the GPS.

24. The computer-implemented method of claim 23, further comprising:

retrieving at least one mobile device identifier associated with the at least one registered asset;

determining a current location of at least one mobile device associated with the at least one mobile device identifier;

determining a current location of the at least one registered asset; and comparing the current location of the at least one mobile device with the current location of the at least one registered asset, wherein:

when the current location of the at least one mobile device is the same as the current location of the at least one registered asset, transmitting the relocation alert using the contact data; and when the current location of the at least one mobile device is not the same as the current location of the at least one registered asset, prompting the registered user to determine if the registered user desires relocation of the at least one registered asset.

25. The computer-implemented method of claim 19, further comprising:

prompting the registered user with safe location options;

receiving from the registered user a selected safe area; and relocating the at least one registered asset to the selected safe area.

26. The computer-implemented method of claim 25, wherein the at least one registered asset is an autonomous vehicle, and wherein the method further comprises:

prompting the registered user to provide a vehicle access code;

automatically engaging the autonomous vehicle using the vehicle access code; and transmitting instructions to the autonomous vehicle for relocation to the selected safe area.

27. The computer-implemented method of claim 19, wherein the at least one processor is further configured to transmit a confirmation alert to an insurer associated with the registered user, the confirmation alert including at least the at least one registered asset and the at least one safe area.

* * * * *